United States Patent [19]

Mattos

[11] 3,837,273
[45] Sept. 24, 1974

[54] ADJUSTABLE CUTTING ARRANGEMENT FOR FRUIT PITTING APPARATUS

[76] Inventor: David W. Mattos, Rt. 2, Box 861 Crosley Ave., San Jose, Calif. 95131

[22] Filed: Dec. 10, 1971

[21] Appl. No.: 206,625

[52] U.S. Cl. ............................................. 99/555
[51] Int. Cl. ........................................... A23n 3/08
[58] Field of Search ............................. 99/547–550, 99/553, 555; 83/420, 425

[56] References Cited
UNITED STATES PATENTS

| | | | |
|---|---|---|---|
| 2,474,492 | 6/1949 | Perrelli | 99/555 |
| 2,556,266 | 6/1951 | Furtado | 99/549 X |
| 2,735,465 | 2/1956 | Kellogg | 99/550 |
| 2,735,466 | 2/1956 | Krstinich | 99/555 |
| 3,258,045 | 6/1966 | Mattos | 99/550 |

Primary Examiner—Leon G. Machlin
Attorney, Agent, or Firm—Paul B. Fihe

[57] ABSTRACT

Arrangement for cutting and pitting apricots, peaches, plums, and other drupe fruits which are individually and sequentially moved along a number of V-troughs including a rotary power knife above each trough adjacent its terminal extremity which is relatively wide and formed by resilient surfaces to assure rolling movement of the fruits, each knife being supported for longitudinal and transverse adjustment to enable desired positioning for optimal cutting and pitting of the fruits during the operation.

1 Claim, 6 Drawing Figures

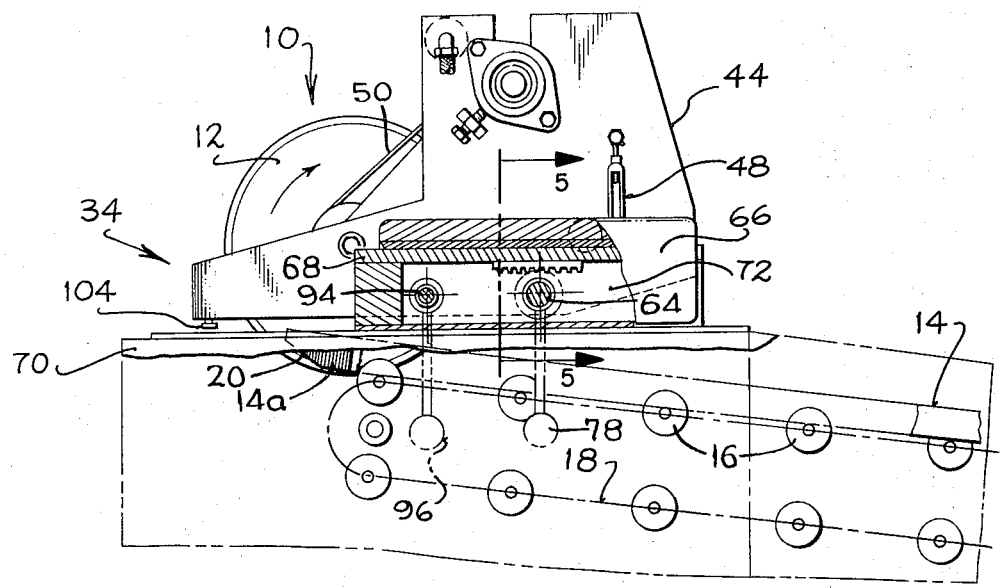
FIG_1
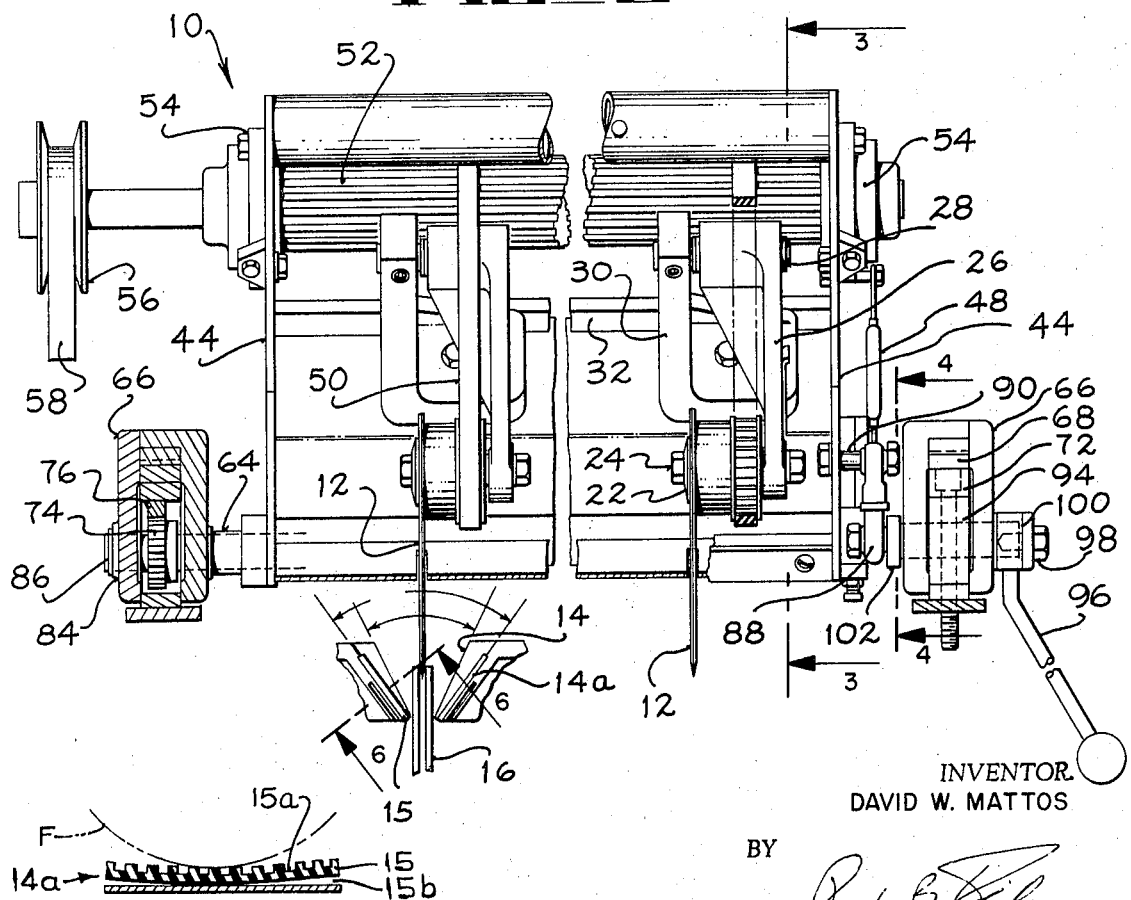
FIG_2
FIG_6
INVENTOR
DAVID W. MATTOS
BY
PATENT AGENT

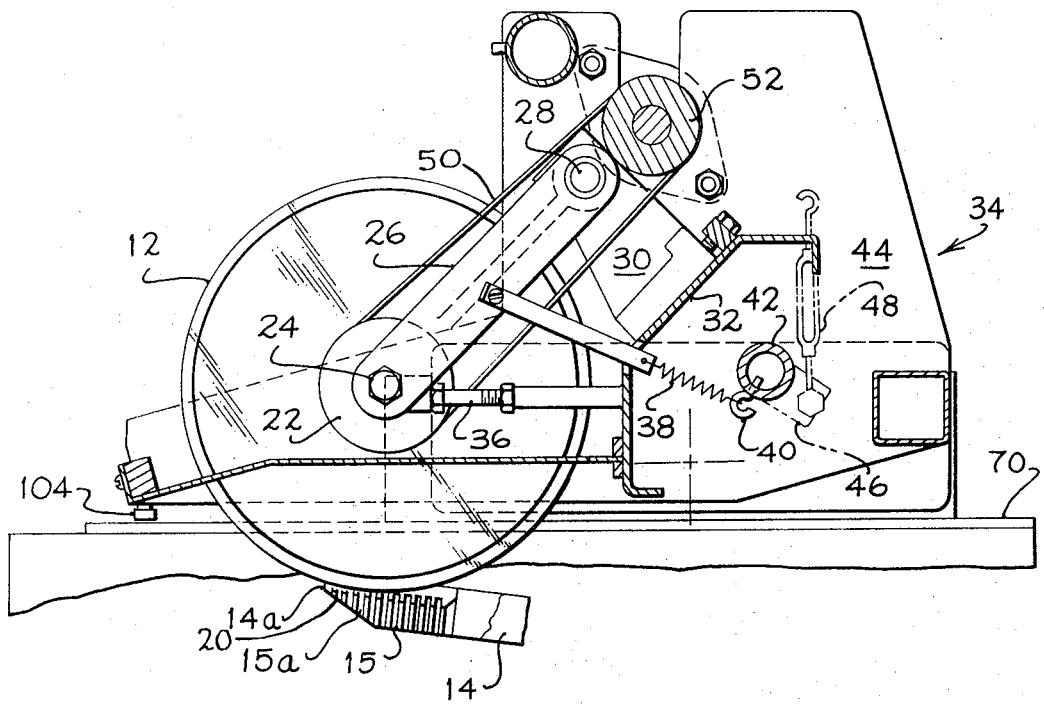
FIG_3
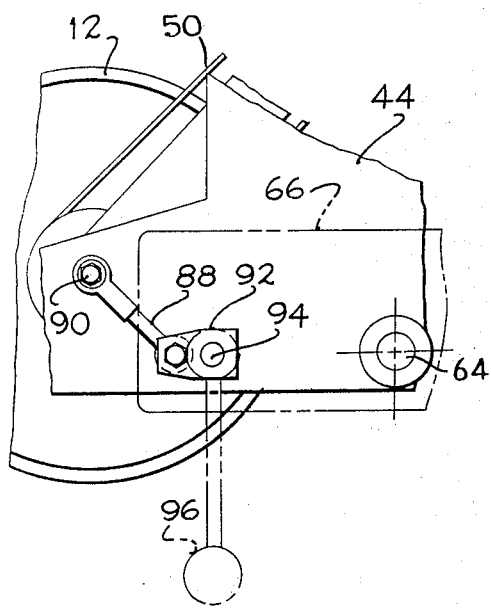
FIG_4
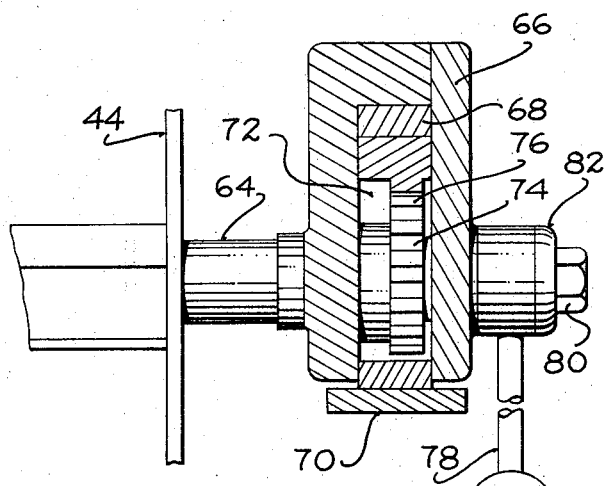
FIG_5
INVENTOR.
DAVID W. MATTOS

ADJUSTABLE CUTTING ARRANGEMENT FOR FRUIT PITTING APPARATUS

FIELD OF THE INVENTION

The present invention relates generally to fruit pitting apparatus and more particularly to a fruit cutting arrangement supported for adjustment during the fruit halving and pitting operation to maximize its effectiveness.

BACKGROUND OF THE INVENTION

The desired processing of pitted fruits, such as apricots, peaches, plums, and other drupe fruits, requires that each individual fruit be halved and the pit expelled therefrom to avoid the obvious tedium of performing such operation manually. Machines such as described in U.S. Pat. No. 3,258,045 entitled, "FRUIT PITTING APPARATUS", have been devised and generally provide for a separation of individual fruits from a hopper, and conveyance thereof, in sequence, along an orienting conveyor which brings the suture plane of each fruit to a vertical disposition enabling cutting engagement with a rotary, power-driven, generally circular knife, both to halve the fruit and contact the pit in its center to expel the same. Depending upon the growing conditions and the precise time of harvest, the fruits may vary in size and in softness (ripeness). While all the fruits were properly oriented, the noted variations in fruit size and softness have not been properly accommodated, and imperfect halving cuts and fragmentation of the pits have occurred to provide a less than desirable end product.

THE SUMMARY OF THE PRESENT INVENTION

Accordingly, it is the general objective of the present invention to provide a cutting arrangement mounted relative to the fruit conveying and orienting portion of the apparatus for adjustment during operation of the fruit pitting and halving apparatus to accommodate variances in the drupe fruit of the type mentioned hereinabove. In accordance with the invention, this objective is achieved by mounting one or more power driven, generally circular cutting knives in the desired dispositions to intersect the respective parallel paths of the fruits being sequentially conducted by an orienting conveyor in the fashion described in the above-mentioned U.S. Pat. No. 3,258,045 or brought into such oriented disposition by any other analogous mechanism which will orient and move the fruit along one or more predetermined paths adjacent the cutting knife or knives so that the halving and pitting operation may proceed. Each generally circular cutting knife has a slightly undulating perimetral surface and is supported for driven rotation at one end of a pivot arm whose other extremity is pivotally supported on a transverse rod carried by a knife assembly frame. A stop on the frame limits the downward pivotal motion of the pivot arm, and accordingly, the degree of penetration of the cutting knife into the fruit. Spring means are connected between each cutting knife and the frame to normally urge the pivot arm towards the stop, and consequently the knife into intersecting relationship with the fruit but permits the pivot arm and the knife supported thereon to swing away from the stop position depending upon the character of the fruit encountered. For example, with larger or harder fruit, contact of the fruit with the cutting knife will provide greater resistance to the cutting action, and the knife will accordingly be moved further away from the stop position. In accordance with one aspect of the present invention, the amount of spring force can be adjusted during operation thus to accommodate for the mentioned variations in the character of the fruit engaged by the cutting knife. More particularly, if a plurality of knives are supported adjacent a corresponding number of fruit supporting and orienting conveyors, all of the spring structures are connected in an eccentric position to a common adjustment shaft whose rotary adjustment will simultaneously effect a change in the spring force exerted on the pivot arms.

The rods supporting the pivot arms and the knives therefrom as well as the described rotary adjustment shaft for the springs are mounted from a common knife assembly frame which itself is mounted from the main frame of the apparatus for adjustment during operation in each of two directions to vary the cutting action depending upon the character of the fruit. More particularly, the frame is mounted for adjustment generally along the path of fruit motion thus to vary the initial point of contact between each cutting knife and a fruit supported thereunder, this enabling the knife to be positioned so that as the fruit is moved with a rolling motion thereunder, an accurate 360° cut around the entire periphery of the fruit in its suture plane is achieved. Preferably, the supporting structure for the fruit at this point is provided with a resilient frictional surface to assure the rolling action of the fruit during the cutting operation thus to allow the complete 360° cut, no more and no less.

Additionally, the knife assembly frame is also mounted for pivotal adjustment, thus to effect an adjustment of the position of all of the knives simultaneously in a direction substantially transverse to the direction of fruit motion through the supporting structure. This adjustment can also be made during operation so that the results on the fruit being halved and pitted can be immediately observed. Once the particular character of fruit is properly accommodated to provide the proper halving cut and expulsion of the pit, no further adjustment is made until a different character of fruit is encountered.

After any one of the described adjustments is made, the apparatus can be locked in its adjusted position until further adjustments need to be made, at which time, the particular adjustment mechanism is released from its locked position and adjusted until the desired character of halving and pitting is achieved, whereupon the adjustment means is once again locked.

BRIEF DESCRIPTION OF THE DRAWINGS

The stated objective of the invention and the manner in which it is achieved, as summarized hereinabove, will be more readily understood by reference to the following detailed description of an exemplary embodiment of the invention illustrated in the accompanying drawings wherein:

FIG. 1 is a fragmentary side elevational view of an adjustable cutting arrangement embodying the present invention shown in association with a portion of an entire apricot halving and pitting apparatus, FIG. 2 is a fragmentary end elevational view of the FIG. 1 apparatus as viewed from the left thereof, FIG. 3 is a fragmentary cross-sectional view taken along line 3—3 of FIG. 2 illustrating details of an individual cutting knife and its mounting arrangement, FIG. 4 is an enlarged cross-sectional view taken along line 4—4 of FIG. 2 illustrating details of one adjustment mechanism, FIG. 5 is another enlarged fragmentary sectional view taken along line 5—5 of FIG. 1 illustrating details of a second adjustment mechanism, and FIG. 6 is a fragmentary operational view taken along line 6—6 of FIG. 2.

DETAILED DESCRIPTION OF THE EXEMPLARY EMBODIMENT OF THE INVENTION

With initial reference of FIGS. 1 and 2, the adjustable cutting arrangement embodying the present invention and generally indicated by the numeral 10 includes a plurality of generally circular power-driven knives 12 supported in a manner to be described in detail hereinafter in parallel vertical planes to project downwardly into respective ones of a plurality of parallel V-shaped fruit-conveying troughs 14 adjacent the outlet ends thereof to perform a combined halving and pitting operation on apricots. Generally, each of the V-shaped troughs 14 is formed as described in detail in the previously mentioned U.S. Pat. No. 3,258,045 by a pair of angularly related planar sides whose lower ends terminate in spaced relationship so as to allow a plurality of thin rollers 16 to project upwardly therethrough in spaced relationship, such rollers being supported from an endless chain 18 whose upper flight moves from right to left as viewed in FIG. 1 so as to effect sequential conveyance of individual apricots in a rolling fashion along each of the V-shaped troughs 14, thus to provide not only conveyance of the apricots but an orientation thereof during such conveyance so that each apricot arrives at a position on the trough below the mentioned cutting arrangement 10 with its suture plane disposed vertically corresponding to the plane defined by the individual cutting knife 12 thereabove. Since the orienting conveyor is substantially as described in the mentioned previous U.S. patent and in and of itself forms no part of the claimed invention, reference is made to that Patent for details of its structure and operation.

However, one structurally significant modification of the V-troughs 14 as described in that prior U.S. patent is made in accordance with the present invention to render the apricot halving and pitting operation more effective. More particularly, in the prior Patent, in order to achieve the best orienting function, the angular sides of the V-trough 14 vary from an open obtuse angle (115°) adjacent the entrance or inlet end of each V-trough to an acute angle (50°) adjacent the outlet end thereof. In the present structure, as can be best visualized by reference to FIG. 2, the outlet extremity of each V-shaped trough 14 below the knife 12 is provided with a short section 14a having a larger angle (75°). The larger angle permits proper expulsion of the pit and additionally provides adequate lateral space to permit complete separation of the two cut halves of the apricot. The outlet extremities of the trough also have rearwardly slanting terminal edges 20 which combined with the more open lateral angular relationship assure appropriate rotation of the individual apricot regardless of its size.

As explained generally in the prior U.S. Pat. No. 3,258,045, the combined contact of each fruit by the rotating knife 12 and rollers 16 tends to roll the fruit along the trough 14a so that a full 360° cut is made. However, in accordance with a feature of the present invention, the surface of the terminal trough section 14a is arranged to increase frictional resistance to sliding of the fruit thus to assure the desired rolling thereof and consequent complete cut and pit expulsion. More particularly, the frictional surface is provided by a rubber pad 15 whose lower portion which contacts the fruit is provided with parallel upright rectangular grooves 15a (see FIG. 3) and is spaced from the main body of the trough section 14a as indicated at 15b in FIG. 2. The grooves 15a offer frictional resistance and the space 15b provides indentation of the rubber by an engaged fruit F as indicated in FIG. 6 so that additional frictional resistance is gained.

With continued reference to FIGS. 1 and 2 and additional detailed reference to FIG. 3, each of the circular cutting knives 12 does not have a generally circular periphery which however is slightly undulated in the fashion described in the previously mentioned U.S. Pat. No. 3,258,042 to effectively halve each apricot and expel the pit therefrom. Each knife 12 is removably bolted to one side of a rotor 22 mounted by suitable bearings on a rod 24 that projects laterally from the lower forward end of a pivot arm 26 whose remote end is pivotally supported from a rod 28 that projects laterally from a bracket 30 mounted from a cross member 32 of the knife assembly frame 34. Accordingly, the knife 12 is supported for rotation about its own axis and also for pivotal motion with the supporting pivot arm 26 in a generally translatory up and down motion toward or away from the apricot supporting trough 14 thereunder and the apricots supported thereon. An adjustable stop 36 is supported from the knife assembly frame 34 so as to engage the pivot arm 26 adjacent its lower free end thus to limit, in an adjustable fashion, the approach of the cutting knife 12 towards the trough 14 and the fruit thereon. Preferably, such adjustment is made to allow the high point of the undulating periphery of the cutting knife 12 to fully enter the body of the apricot and to slightly engage the central pit thus to allow its expulsion from the halved fruit but to avoid fragmentation thereof.

While the pivotally-supported knife 12 will obviously be urged downwardly towards the fruit by simple gravational force, it is preferred, in accordance with the present invention, to provide means for adjusting such force, thus to accommodate fruits of different sizes and also of different degrees of ripeness so that they may be softer or harder. The adjustment means preferably takes the form of a coil spring 38 (see FIG. 3) connected under tension between each of the pivot arms 26 and a hook 40 projecting radially from a rotatively-adjustable spring tension shaft 42 mounted for its rotative adjustment in bridging relationship between the parallel side plates 44 of the knife assembly frame 34. At its extremity, as shown in FIG. 3, a radially-extending bracket 46 is secured to the end of the shaft 42 and its projecting end is pivotally joined to one end of the turnbuckle 48 whose upper extremity is in turn joined to the side plate 44. Manual adjustment of the turnbuckle 48 to vary its overall length will accordingly effect rotation of the spring tension shaft 42 and will simultaneously effect an equivalent increase or decrease in the spring force urging each of the pivot arms 26 downwardly towards the troughs 14. It is to be particularly noted that the adjustment turnbuckle 48 can be manually turned during machine operation so that visual observation of the apricots emanating from the apparatus will enable the proper adjustment to be accurately made.

All of the cutting knives 12 are driven in a clockwise direction, as viewed in FIGS. 1 and 3, by individual connections of separate timing belts 50 from the rotors 22 to a single drive shaft 52 supported for rotation in suitable bearings 54 mounted on the side plates 44 of the knife assembly frame 34, one projecting extremity of the drive shaft mounting a variable pitch pulley 56 that in turn is connected by a standard pulley belt 58 to an aligned pulley on a suitable drive motor (not shown).

As best shown in FIG. 3, the angle formed by a line connecting the axis of the drive shaft 52 and the axis of each knife 12 relative to the path of apricot motion is slightly less than the angle defined by the longitudinal dimension of the knife-supporting pivot arm 26 when such pivot arm is in engagement with the described stop 36. Accordingly, if because of engagement with an apricot, the knife 12 is moved upwwardly away from the path of fruit motion, slightly increased tension on the timing belt 50 is experienced so that continued excellent driving relationship between the drive shaft 52 and the individual cutting knives 12 is maintained. Thus, a positive driving relationship with the individual cutting knives is assured, and it may be mentioned that the individual stops 36 need not be adjusted to interfere with the described arrangement because a transverse up and down adjustment of the entire knife assembly frame 34 can be made in accordance with the present invention and as will be described in detail hereinafter.

Generally, means are provided to support all the knives 12 for adjustment in a longitudinal direction relative to the described V-troughs 14 and the path of apricot motion therealong and also transversely relative thereto. More particularly, in the present instance where a plurality of knives 12 are supported from the single knife assembly frame 34 including the described side plates 44 and connecting cross members, this entire frame is supported for such adjustments so that a simultaneous, longitudinal and/or transverse adjustment of all of the knives can be carried out during operation of the apparatus. With continued reference to FIGS. 1 and 2, and additional detailed reference to FIGS. 4 and 5, a rotatively adjustable shaft 64 is arranged to support the knife assembly frame 34 for longitudinal adjustment relative to the path of apricot motion on the V-troughs 14 and for this purpose extends through aligned openings in the side plates 44 of the knife assembly frame 34 and in turn is rotatively supported at its opposite extremities in similar carrier members 66 that are each formed, as best shown in FIG. 5, by two sections to provide an elongated member of substantially inverted U-shaped cross section, and are slidably supported on upstanding rails 68 that are in turn secured on opposite sides of the main apparatus frame 70 adjacent its outlet end. The end of the adjustment shaft 64 is rotatably supported in aligned openings in each of the carrier members 66 and passes through an enlarged elongated slot 72 in each rail 68. Within such slot 72, a pinion gear 74 is keyed to the shaft 64 and is arranged to mesh with a downwardly facing rack 76 on the side rail. Accordingly, if the adjustment shaft 64 is rotated, the carrier member 66 and the knife assembly frame 34 supported therefrom will be moved longitudinally relative to the main apparatus frame 70 and as a result longitudinally with regard to the V-troughs 14. A handle 78 is secured to one end of the adjustment shaft 64 to enable manual rotation to provide the longitudinal adjustment, and once such adjustment has been made, means are provided for locking the knife assembly frame 34 in adjusted position relative to the apparatus frame 70. For this purpose, a small bolt 80 with an hexagonal head is threaded into one end of the adjustment shaft 64 and is arranged to engage a washer 82 which laterally engages the hub portion of the handle 78. When such bolt 80 is tightened, the entire shaft 64 is pulled to the right, as viewed in FIG. 4, so that another washer 84 at the opposite extremity of the shaft 64 and held in position by a retaining ring 86 is pulled against the carrier member 66 on the remote side wherefore clamped locking of the adjustment shaft 64 relative to the carrier members is achieved.

In order to provide the mentioned transverse adjustment of the knife assembly frame 34, a tie rod 88 (FIG. 4) is pivotally connected at one end to a pin 90 projecting laterally from the one side plate 44 adjacent its forward end relative to the direction of motion of the apricots and at its other end to the outer extremity of a radial bracket 92 on the inner end of an adjustment shaft 94 which extends through and is rotatively supported in aligned openings in the sections of the inverted U-shaped carrier member 66, the central portion of this adjustment shaft 94 being accommodated within the elongated slot 72 (see FIG. 2) in the described rail 68 so that the shaft may shift forwardly or rearwardly with the knife assembly frame 34 when the previously described longitudinal adjustment is made. The outer projecting end of this adjustment shaft 94 mounts a handle 96 whose manual actuation will rotate the adjustment shaft 94 and in turn effect raising or lowering of the tie rod 88 and the forward end of the knife assembly frame 34 about a pivotal axis as defined by the previously described longitudinal adjustment shaft 64. While the adjustment of course is along an arcuate path, it is primarily transverse to the path of apricot motion so that manipulation of the handle 96 will either raise or lower the knife assembly frame 34 and the knives 12 carried thereby. Once the transverse adjustment has been made, the knife assembly frame 34 can be locked in its adjusted position with locking means somewhat similar to that described in connection with the longitudinal adjustment mechanism. As shown, a hexagonal head bolt 98 enters a threaded opening in the end of the transverse adjustment shaft 94 so that upon tightening, the head of the bolt presses against a washer 100 which engages the side of the hub of the handle 96 on the shaft and also pulls the shaft to the right so that a clamp washer 102 on the other side of the carrier member 66 is pulled into clamping engagement thereagainst, thus to lock the shaft against rotative adjustment until the hexagonal head bolt 98 is again loosened. As a safety precaution, to avoid excessive lowering of the knife assembly frame 34, an adjustable 104 is supported at the forward end of the frame 34 and is arranged to engage the main apparatus frame 70 to restrict its downward motion.

It will be apparent from the foregoing structural description that both the longitudinal and transverse adjustments can be made during machine operation. Basically, it is desirable to have a full 360° cut of the apricot, and since the power driven knives 12 effect a rolling action of the apricots along the terminal or outlet portion 14a of the V-troughs 14, the longitudinal adjustment of the knife assembly frame 34 is made to achieve such 360° cut with the particular apricots being handled. Generally speaking, if larger fruit is being handled, the knife assembly frame 34 is adjusted forwardly until the required 360° cut is obtained which proper operation may be checked by visual observation of the emerging product.

The transverse adjustment can also be made while the apparatus is operating and generally the knife assembly frame 34 will be raised when larger or softer apricots are to be handled. Visual observation of the emerging product will also enable the operator to immediately ascertain when the correct adjustment has been made.

While but one exemplary apparatus has been described, it will be apparent that many modifications can be made without departing from the spirit of the invention and the foregoing description is not to be construed in a limiting sense and the actual scope of the invention is to be indicated only by reference to the appended claims.

What is claimed is:

1. Arrangement for cutting apricots or other drupe fruits supported for movement along a predetermined path which comprises
   an apparatus frame
   a rotary-powered knife in the form of a general circular blade,
   means mounting said knife for movement transversely relative to the path of fruit motion into intersecting cutting relation to the fruit moving along such path, said knife-mounting means including a pivot arm mounting said knife for pivotal motion toward and away from the path of fruit motion, said knife being mounted from end of said pivot arm for rotation,
   a knife assembly frame supporting the other end of said pivot arm for pivotal motion, a stop on said knife assembly frame and arranged to limit the pivotal motion of said pivot arm and knife thereon toward the path of fruit motion, spring means connected between said pivot arm and said knife assembly frame to resiliently urge said pivot arm against said stop, means for adjusting the resilient force of said spring means, a drive shaft mounted on said knife assembly frame, means including pulleys and a belt connecting said drive shaft to said rotary knife to drive the latter, said knife being disposed when said pivot arm is against said stop so that the line defined by said pivot arm is at a greater angle relative to the path of fruit motion than the line defined by said pulley-belt drive connection, means adjustably supporting said knife assembly frame for adjustment relative to the apparatus frame and the predetermined path of fruit motion, a V-trough for conducting fruits to said knife, the terminal section of said trough adjacent said knife having a greater included angle than the adjacent section thereof, the terminal section of said V-trough adjacent said knife being formed by a resilient pad with parallel grooves in its surface, the portion of said pad with said grooves being supported in slightly spaced relation from the remainder of said V-trough section.

* * * * *